Patented Feb. 13, 1934

1,946,707

UNITED STATES PATENT OFFICE 1,946,707

PROCESS OF MANUFACTURING ACETIC ANHYDRIDE

Rudolf Meingast and Martin Mugdan, Munich, Germany, assignor to Consortium fur Elektrochemische Industrie, Munich, Germany No Drawing. Application October 14, 1927, Serial No. 226,264, and in Germany October 18, 1926

24 Claims. (Cl. 260—123)

The object of this invention is the production of acetic anhydride by a catalytic method from acetic acid.

We have discovered that the formation of acetic anhydride from acetic acid vapor at elevated temperatures can be accelerated or catalyzed by means of gaseous materials. We have found that gaseous materials especially suited for this purpose are volatile inorganic acidic compounds or those which form acids at the temperature of formation of acetic anhydride and water from acetic acid, generally above 400° C., and especially between 400 and 800° C. Of these materials, we have found that the most suitable are phosphorus and its volatile compounds, such as phosphoric acid or phosphoric acid esters and the like. To secure the benefits of this catalytic material it is only necessary to add a very small amount of the catalyst to the acetic acid vapors, and then apply heat.

The use of such gaseous catalysts is especially valuable in that there is no difficulty in the preservation of a catalyst mass, deterioration of the catalyst by continued use or of catalyst recovery.

Example I

A carbon tube is electrically heated to about 650° C. and a stream of acetic acid vapor passed through the tube. At the inlet end of the tube, a solution of phosphoric acid in acetic acid is allowed to enter the vapor stream; the addition of this phosphoric acid solution is so regulated that 0.5 of a gram of phosphoric acid are added to each kilo-gram of acetic acid vapor passing through the tube. The speed of the acetic acid vapor in the tube may vary considerably, but is adjusted so that the decomposition products are at a minimum. This adjustment is reached by trial and analysis of the off-gases. The off-gases coming from the tube are condensed by cooling; the condensate obtained contains over 40% of acetic anhydride, an equivalent amount of water, and the remainder unchanged acetic acid.

We have also operated this process by dissolving the phosphoric acid directly in the acetic acid before vaporization and allowing this solution to flow into the heated tube.

We have also obtained similar results by utilizing as a catalyst 0.5 of a gram of phosphorus for each kilo-gram of acetic acid. In this case the phosphorus is supplied as a solution or emulsion in acetic acid. Similar results have also been produced by alkyl esters of phosphoric acid such as methyl or ethyl esters, boric acid and other weak volatile inorganic acids.

The process of our invention can also be utilized in connection with the process described in our copending application S. N. 196,137, filed June 2, 1927, Patent #1,878,593, issued September 20, 1932. This application relates to preheaters of chrome iron alloys in the vaporization of acetic acid, and a subsequent manufacture of acetic anhydride. In the use of the present invention in this connection, the acetic acid vapors are first heated to the reaction temperature in a chrome iron alloy preheater, at the same time a certain amount of anhydride is obtained, this superheated acetic acid vapor is caused to take up the volatile catalyst in the form of vapor or dissolved in acetic acid as described above. The reaction chamber of the anhydride production may be made of steel rich in chromium, copper, silicon, carborundum, quartz or other material which does not appreciably decompose acetic acid vapor. Electrical heating of the preheater and reaction vessel is advantageous. The adaptation of the present process referred to above is shown in the following example.

Example II

Acetic acid vapor is passed through a coil of chrome nickel steel and heated therein to a temperature of about 600° C.; from here the vapors are caused to flow through a carbon tube heated to about 680° C. A solution of triethyl-phosphate in glacial acetic acid is allowed to enter the hot acetic acid vapor stream at the entrance to the carbon reaction tube; this catalyst is supplied at a rate sufficient to provide 0.5 of a gram of catalyst per kilo-gram of acetic acid. The remainder of the process is similar to that described in Example I. This preheating of the acetic acid vapor increases considerably the output of the apparatus. The condensate from this contained about 40% acetic anhydride.

We have, furthermore, found that our process may be used in combination with the processes described in U. S. P. 1,570,514 and U. S. P. 1,636,701. In this adaptation the acetic acid vapors, containing the volatile catalyst as above described are passed through the solid or liquid catalyst described in the above patents. The presence of the gaseous catalyst considerably increases the yield of anhydride obtained.

Example III

Acetic acid vapor is first superheated to 600° C. and then phosphoric acid is introduced to the vapor in a proportion of 0.3 gram per kilo-gram of acetic acid. This mixture is now passed through a carbon tube into a molten mass comprising equimolecular proportions of sodium and lithium metaphosphates contained in a graphite crucible and heated to about 700° C. A high yield of anhydride is obtained from this procedure, the condensate containing about 50% acetic anhydride.

We claim:

1. Process for the manufacture of acetic anhydride which comprises heating acetic acid vapor containing a small amount of a volatile inorganic weak acid as a catalyst for the formation of acetic anhydride to a temperature between 400° and 800° C.

2. Process for the manufacture of acetic anhydride which comprises heating acetic acid vapor containing a small amount of a volatile inorganic weak acid as a catalyst for the formation of acetic anhydride to a temperature of about 650° C.

3. Process for the manufacture of acetic anhydride which comprises preheating the acetic acid vapors, adding a small amount of a volatile inorganic weak acid as a catalyst for the formation of acetic anhydride to the preheated vapors and heating the mixed vapors to between 400° and 800° C.

4. Process for the manufacture of acetic anhydride which comprises highly preheating acetic acid vapor, adding to the preheated vapor as a catalyst for the formation of acetic anhydride a small amount of a volatile material capable of forming a volatile inorganic weak acid in the heating zone and heating the mixed vapors to about 650° C.

5. Process for the manufacture of acetic anhydride which comprises preheating acetic acid vapor to between 400° and 800° C., adding to the preheated vapor as a catalyst for the formation of acetic anhydride a small amount of a volatile material capable of forming a volatile inorganic weak acid in the heating zone and heating the mixed vapors to between 400° and 800° C.

6. Process for the manufacture of acetic anhydride which comprises preheating acetic acid vapor to a temperature of between 400° and 800° C., adding to the preheated vapor a small amount of an acidic phosphorous compound as a catalyst for the formation of acetic anhydride and heating the gaseous mixture to between 400° and 800° C.

7. Process for the manufacture of acetic anhydride which comprises forming a mixture of acetic acid vapor and a small amount of a volatile inorganic weak acid as a catalyst for the formation of acetic anhydride and passing this mixture in contact with a metal salt of a non-volatile mineral acid at a temperature of between 400° and 800° C.

8. Process for the manufacture of acetic anhydride which comprises forming a mixture of acetic acid vapor and a small amount of a volatile inorganic weak acid as a catalyst for the formation of acetic anhydride and passing this mixture in contact with a metal salt of a non-volatile mineral acid at a temperature of about 650° C.

9. Process for the manufacture of acetic anhydride which comprises forming a mixture of acetic acid vapor and a small amount of a volatile inorganic weak acid as a catalyst for the formation of acetic anhydride and passing this mixture in contact with a molten catalyst mass containing a phosphorous compound at a temperature of between 400° and 800° C.

10. Process for the manufacture of acetic anhydride which comprises forming a mixture of acetic acid vapor and a small amount of a volatile inorganic weak acid as a catalyst for the formation of acetic anhydride and passing this mixture in contact with a molten catalyst mass containing a phosphorous compound at a temperature of between 400° and 800° C.

11. Process for the manufacture of acetic anhydride, which comprises heating to about 650° C. acetic acid vapor and a catalyst selected from the group consisting of volatile weak inorganic acids and volatile substances capable of forming said acids on heating.

12. Process for the manufacture of acetic anhydride, which comprises heating acetic acid vapor and a catalyst selected from the group consisting of volatile weak inorganic acids and volatile substances capable of forming said acids below 400° C., between 400° and 800°C.

13. Process for the manufacture of acetic anhydride, which comprises heating acetic acid vapor and a catalyst selected from the group consisting of phosphoric acid and volatile substances capable of forming said acid below 400° C., between 400° and 800° C.

14. Process for the manufacture of acetic anhydride, which comprises heating acetic acid vapor and a catalyst selected from the group consisting of phosphorus, phosphoric acid, and volatile esters of phosphoric acid, between 400° and 800° C.

15. Process for the manufacture of acetic anhydride, which comprises heating acetic acid vapor and a catalyst selected from the group consisting of phosphoric acid and volatile esters of phosphoric acid, between 400° and 800° C.

16. Process for the manufacture of acetic anhydride, which comprises heating acetic acid vapor and phosphoric acid as a catalyst between 400° and 800° C.

17. Process for the manufacture of acetic anhydride, which comprises heating acetic acid vapor to between 400° and 800° C., adding thereto a catalyst selected from the group consisting of volatile weak inorganic acids and volatile substances capable of forming said acids below 400° C., and then heating the mixed vapors to between 400° and 800° C.

18. Process for the manufacture of acetic anhydride, which comprises heating acetic acid vapor to between 400° and 800° C., adding thereto a catalyst selected from the group consisting of phosphoric acid and volatile substances capable of forming said acid below 400° C., and then heating the mixed vapors to between 400° and 800° C.

19. Process for the manufacture of acetic anhydride, which comprises heating acetic acid vapor to between 400° and 800° C., adding thereto a catalyst selected from the group consisting of phosphorus, phosphoric acid, and volatile esters of phosphoric acid, and then heating the mixed vapors to between 400° and 800° C.

20. Process for the manufacture of acetic anhydride, which comprises heating acetic acid vapor to between 400° and 800° C., adding thereto phosphoric acid as a catalyst, and then heating the mixed vapors to between 400° and 800° C.

21. Process for the manufacture of acetic anhydride, which comprises forming a mixture of acetic acid vapor and a catalyst selected from the group consisting of volatile weak inorganic acids and substances capable of forming said acids below 400° C., and then passing said mixture in contact with a metal salt of a non-volatile mineral acid at a temperature between 400° and 800° C.

22. Process for the manufacture of acetic anhydride, which comprises forming a mixture of acetic acid vapor and a catalyst selected from the group consisting of phosphoric acid and volatile substances capable of forming said acid below 400° C., and then passing said mixture in contact with a metal salt of a non-volatile mineral acid at a temperature between 400° and 800° C.

23. Process for the manufacture of acetic anhydride, which comprises forming a mixture of acetic acid vapor and a catalyst selected from the group consisting of phosphorus, phosphoric acid, and volatile esters of phosphoric acid, and then passing said mixture in contact with a metal salt of a non-volatile mineral acid at a temperature between 400° and 800° C.

24. Process for the manufacture of acetic anhydride, which comprises forming a mixture of acetic acid vapor and phosphoric acid as a catalyst, and then passing said mixture in contact with a metal salt of a non-volatile mineral acid at a temperature between 400° and 800° C.

RUDOLF MEINGAST.
MARTIN MUGDAN.